(12) United States Patent
Reddy et al.

(10) Patent No.: US 11,962,156 B2
(45) Date of Patent: Apr. 16, 2024

(54) SYSTEMS AND METHODS FOR CONSTRAINED OPTIMIZATION OF A HYBRID POWER SYSTEM THAT ACCOUNTS FOR ASSET MAINTENANCE AND DEGRADATION

(71) Applicant: Caterpillar Inc., Peoria, IL (US)

(72) Inventors: Suresh Baddam Reddy, Peoria, IL (US); Dimple Raja Prathapaneni, Samanathnam (IN)

(73) Assignee: Caterpillar Inc., Peoria, IL (US)

( * ) Notice: Subject to any disclaimer, the term of this patent is extended or adjusted under 35 U.S.C. 154(b) by 281 days.

(21) Appl. No.: 17/406,687

(22) Filed: Aug. 19, 2021

(65) Prior Publication Data
US 2023/0060100 A1    Feb. 23, 2023

(51) Int. Cl.
*H02J 3/38* (2006.01)
*G05B 19/042* (2006.01)
*H02J 13/00* (2006.01)

(52) U.S. Cl.
CPC ............ *H02J 3/381* (2013.01); *G05B 19/042* (2013.01); *H02J 13/00002* (2020.01);
(Continued)

(58) Field of Classification Search
CPC .. H02J 3/381; H02J 13/00002; H02J 2310/12; H02J 2300/20; H02J 3/003;
(Continued)

(56) References Cited

U.S. PATENT DOCUMENTS

| 9,002,615 B2 | 4/2015 | Kumar et al. |
| 9,742,189 B2 | 8/2017 | Watanabe |

(Continued)

FOREIGN PATENT DOCUMENTS

| CN | 107878445 A | 4/2018 |
| CN | 109017809 A | 12/2018 |
| CN | 110254418 A | 9/2019 |
| CN | 111162295 A | 5/2020 |
| CN | 112583017 A | 3/2021 |
| TW | I542493 B | 7/2016 |

OTHER PUBLICATIONS

European Extended Search Report for Int'l. Patent Appln. No. 22186811.0, dated Mar. 14, 2023 (10 pgs).

(Continued)

*Primary Examiner* — Mohammad Ali
*Assistant Examiner* — Dhruvkumar Patel
(74) *Attorney, Agent, or Firm* — Bookoff McAndrews PLLC

(57) ABSTRACT

Systems and methods for operating a hybrid power system are disclosed. A controller may perform operations, including: obtaining load data for the hybrid power system; obtaining power availability data and energy cost data for each power asset in each power asset group of a plurality of power asset groups; and determining active power commands for each power asset by performing at least one optimization, such that the determined active power commands optimize a total operating cost, wherein: the at least one optimization is based on at least one cost function that accounts for asset degradation, asset maintenance cost, asset operation efficiency cost, and the energy cost data; and the at least one optimization is constrained by a plurality of constraints based on the load data, the power availability data, and characteristics of the power assets; and operating each power asset based on the determined active power commands.

19 Claims, 5 Drawing Sheets

(52) U.S. Cl.
CPC ... *G05B 2219/2639* (2013.01); *H02J 2300/24* (2020.01); *H02J 2310/12* (2020.01)

(58) Field of Classification Search
CPC .... H02J 3/004; H02J 2300/10; H02J 2300/40; H02J 3/466; G05B 19/042; G05B 2219/2639
See application file for complete search history.

(56) References Cited

U.S. PATENT DOCUMENTS

| | | | |
|---|---|---|---|
| 10,252,712 | B2 | 4/2019 | Ossareh et al. |
| 10,289,143 | B2 | 5/2019 | Goldsmith |
| 10,317,924 | B2 | 6/2019 | Schwarz |
| 10,580,094 | B1 | 3/2020 | Haynold |
| 10,855,081 | B2 | 12/2020 | Wenzel et al. |
| 11,251,620 | B2 | 2/2022 | Cai |
| 11,522,487 | B2 | 12/2022 | Dong |
| 11,656,097 | B2 | 5/2023 | Vega |
| 2014/0350743 | A1* | 11/2014 | Asghari ............... G05B 13/048 700/297 |
| 2015/0039145 | A1* | 2/2015 | Yang ..................... H02J 3/00 700/291 |
| 2017/0178158 | A1 | 6/2017 | Chen |
| 2018/0233922 | A1* | 8/2018 | Sun ....................... G05B 15/02 |
| 2019/0339661 | A1* | 11/2019 | Pancholi ............... G06Q 10/04 |
| 2019/0340709 | A1* | 11/2019 | Elbsat .................. G05B 13/026 |
| 2020/0006946 | A1* | 1/2020 | Fife ........................ H02J 3/008 |
| 2020/0198495 | A1 | 6/2020 | Rizzoni et al. |
| 2020/0301383 | A1 | 9/2020 | Reddy |
| 2021/0216932 | A1 | 7/2021 | Koguma et al. |
| 2021/0358058 | A1 | 11/2021 | da Mata Cecilio |
| 2023/0060100 | A1 | 2/2023 | Reddy |
| 2023/0068308 | A1 | 3/2023 | Balasubramanian |

OTHER PUBLICATIONS

European Search Report for Int'l. Patent Appln. No. 22186132.1-1218, dated Jan. 3, 2023 (9 pgs).

* cited by examiner

SYSTEMS AND METHODS FOR CONSTRAINED OPTIMIZATION OF A HYBRID POWER SYSTEM THAT ACCOUNTS FOR ASSET MAINTENANCE AND DEGRADATION

TECHNICAL FIELD

Various embodiments of this disclosure relate generally to hybrid power systems control, and, more particularly, to systems and methods for optimizing hybrid power systems control.

BACKGROUND

Hybrid power systems, e.g., power supply systems that incorporate multiple modes of electricity generation and/or storage, may have many benefits, such as reduced power supply costs or emissions, and/or improved sustainability, reliability, redundancy, or the like. However, managing multiple types of power assets may be complex, and thus it may be difficult to operate a hybrid power system at its full potential. Further, the complexity for managing a hybrid power system may scale rapidly as the number of power assets and power asset types increase.

Different approaches to this control problem have been developed. Some approaches utilize a rule-based algorithm to make power distribution decisions over a plurality of power assets. However, such approaches often miss edge cases, and are generally sub-optimal due to the difficulty of describing such a complex problem space with rules. Some approaches apply optimization techniques. However, the complexity of hybrid power systems may result in optimization being computationally expensive. Additionally, conventional optimization techniques may not account for aspects of power assets that are type-specific, such as maintenance or replacement, asset degradation, or the like.

U.S. Patent Publication No. 2020/0198495 A1 describes a real-time energy management strategy for hybrid electric vehicles with reduced battery aging. This reference discloses adjusting the use of energy sources in a hybrid power system by an Adaptive Equivalent Consumption Management Strategy (A-ECMS) implemented on a supervisory controller. The A-ECMS may take into account both fuel economy and battery capacity degradation to optimize fuel consumption with consideration of battery aging. However, this approach may not account for various aspects of power assets that are type-specific, and moreover does not address the issue of computational complexity as the number of power assets increases.

The disclosed method and system may solve one or more of the problems set forth above and/or other problems in the art. The scope of the current disclosure, however, is defined by the attached claims, and not by the ability to solve any specific problem.

SUMMARY OF THE DISCLOSURE

According to certain aspects of the disclosure, methods and systems are disclosed for optimization of hybrid power control system.

In one aspect, a method of operating a hybrid power system may include: obtaining load data for the hybrid power system; obtaining power availability data and energy cost data for each power asset in each power asset group of a plurality of power asset groups; and determining active power commands for each power asset by performing at least one optimization, such that the determined active power commands optimize a total operating cost of the hybrid power system, wherein: the at least one optimization is based on at least one cost function that accounts for asset degradation, asset maintenance cost, asset operation efficiency cost, and the energy cost data; and the at least one optimization is constrained by a plurality of constraints based on the load data, the power availability data, and characteristics of the power assets; and operating each power asset based on the determined active power commands.

In another aspect, a controller for a hybrid power system may include: at least one memory storing instructions; and at least one processor operatively connected to the memory, and configured to execute the instructions to perform operations. The operations may include: obtaining load data for the hybrid power system; obtaining power availability data and energy cost data for each power asset in each power asset group of a plurality of power asset groups; and determining active power commands for each power asset by performing at least one optimization, such that the determined active power commands optimize a total operating cost of the hybrid power system, wherein: the at least one optimization is based on at least one cost function that accounts for asset degradation, asset maintenance cost, asset operation efficiency cost, and the energy cost data; and the at least one optimization is constrained by a plurality of constraints based on the load data, the power availability data, and characteristics of the power assets; and operating each power asset based on the determined active power commands.

In a further aspect, A hybrid power system may include: a plurality of power asset groups and a controller. The plurality of power asset groups may include two or more of a genset group, an energy storage system group, a photovoltaic group, or a power grid connection. The controller may include: at least one memory storing instructions; and at least one processor operatively connected to the memory, and configured to execute the instructions to perform operations. The operations may include: obtaining load data for the hybrid power system; obtaining power availability data and energy cost data for each power asset in each power asset group of a plurality of power asset groups; and determining active power commands for each power asset by performing at least one optimization, such that the determined active power commands optimize a total operating cost of the hybrid power system, wherein: the at least one optimization is based on at least one cost function that accounts for asset degradation, asset maintenance cost, asset operation efficiency cost, and the energy cost data; and the at least one optimization is constrained by a plurality of constraints based on the load data, the power availability data, and characteristics of the power assets; and operating each power asset based on the determined active power commands.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
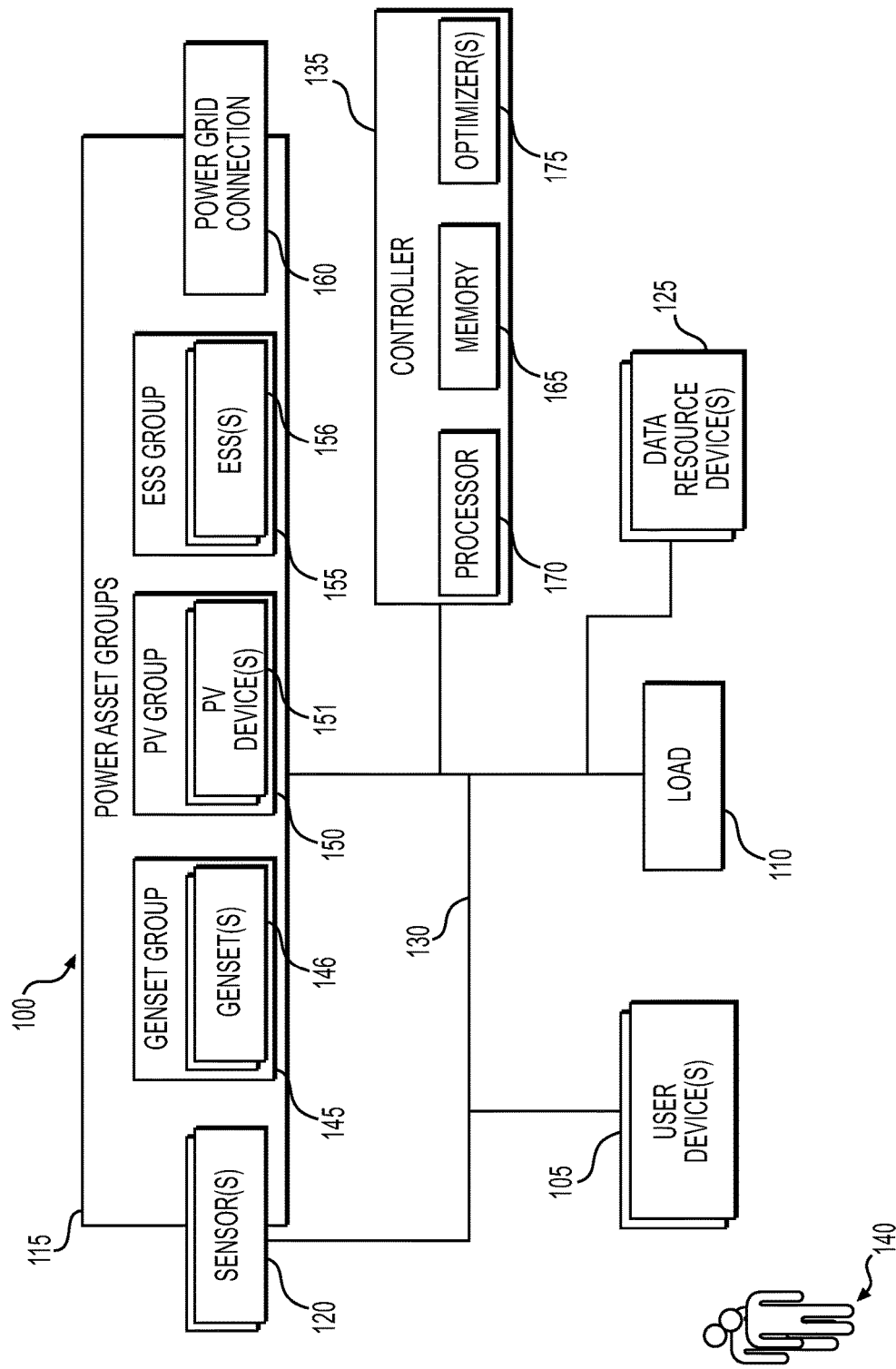
FIG. 1 depicts a schematic of an exemplary hybrid power system, according to one or more embodiments.

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The term "or" is used disjunctively, such that "at least one of A or B" includes, A, B, A and A, A and B, etc. Moreover, in this disclosure, relative terms, such as, for example, "about," "substantially," "generally," and "approximately" are used to indicate a possible variation of ±10% in the stated value.

As used herein, an "on-line" activity generally encompasses an activity that is performed live, during operation, on an instantaneous basis, continuously, in real or near real-time, or the like. A "prospective" activity generally encompasses an activity for which the result or implementation of which is scheduled, is not in or is not updated in real or near real-time, is at least partially non-instantaneous, non-continuous, pertains to forecasting, predictions, a result that is prognostic or that accounts for a range of time, or the like. The term "power asset" generally encompasses a system or device for generating, storing, and/or supplying electrical power. Examples of a power asset include, but are not limited to, gensets (e.g., a combination of an engine and electrical generator used to produce electrical power), a photovoltaic (e.g., a "PV" or solar) cell, an energy storage system such as a battery, a fuel cell, a power grid connection, a wind turbine, a hydro-electric generator, a turbine generator, a reactor, etc.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

In one aspect, a hybrid power system of a micro-grid may include a controller configured to optimize operation of various power assets of different types, e.g., minimize cost of operation, reduce emissions, maintain integrity of the power assets, or the like. To do so, the controller may perform a plurality of different optimizations. For example, the controller may perform at least one prospective optimization that is prognostic, e.g., that considers forecasts for the load of the hybrid power system, the energy cost or power availability of various power assets, or the like in order to determine an optimal schedule for operation of the power assets over a future period of time. The prospective optimization may be performed periodically, e.g., once every fifteen or thirty minutes, once per hour, once per day, etc. The prospective optimization may pertain to a moving future period of time, e.g., an hour, a day, etc., looking ahead from a time at which the prospective optimization is performed. The resulting schedule may include active power commands that describe how a particular power asset is to be operated, e.g., when to turn on or off, when to charge or discharge, etc. In another example, the controller may perform at least one on-line optimization that, e.g., instead of relying on forecasted data, uses on-line data to make real-time or near real-time adjustments to the schedule. For instance, power available from a PV asset may be less than expected due to cloud cover, the hybrid power system may experience a greater than anticipated load, or a cost of grid power or of fuel for a genset may deviate from the forecasted data. The on-line optimization may be used to find an optimal usage of the various power assets of the hybrid power system to account for any such discrepancies. In one aspect, dividing the optimization problem into prospective and on-line optimizations may reduce the computational complexity of the optimization. In another aspect, dividing the optimization problem may enable results that account for future events, e.g., over a period of time, while also accounting for more immediate situations that may not otherwise be captured in a prospective-only approach, such as forecasting errors, course correction, or the like.

In another aspect, the controller of the hybrid power system may be configured to perform one or more optimizations that account for various characteristics of power assets that are type-specific, such as asset degradation, asset maintenance, and particular aspects of different asset types that may impact operating efficiency.

In a further aspect, the controller of the hybrid power system may be configured to perform one or more constrained optimizations. Constraints for one or more optimizations performed by the controller may account for or be associated with various aspects of the hybrid power system such as, for example, the load experienced by the hybrid power system, capacities or ratings of the various power assets, characteristics or operational limitations of the various power assets, resiliency or redundancy parameters, or the like. In some instances, at least a portion of the constraints for the one or more optimizations may be soft constraints, e.g., constraints that weigh in to the optimization but that are not absolute requirements. In some instances, the constraints for the one or more optimizations may be segmented into groups of different priorities.

While several of the examples above involve of a microgrid, it should be understood that techniques according to this disclosure may be adapted to any suitable type of application for a hybrid power system such as, for example, a vehicle power plant (e.g., car, ship, train, etc.), a power source for a building or facility, or the like. It should also be understood that the examples above are illustrative only. The techniques and technologies of this disclosure may be adapted to any suitable activity.

FIG. 1 depicts an exemplary hybrid power system 100 that may be utilized with techniques presented herein. One or more user device(s) 105, a load 110, a plurality of power asset groups 115, one or more sensor(s) 120, and one or more data resource device(s) 125 may be operatively connected to each other and/or may communicate across an electronic network 130. As will be discussed in further detail below, one or more controller(s) 135 may communicate with one or more of the other components of the hybrid power system 100 across electronic network 130. The one or more user device(s) 105 may be associated with a user 140, e.g., a user associated with one or more of managing, maintaining, inspecting, repairing, operating, or controlling the hybrid power system 100, or the like.

The user device 105 may be configured to enable the user 140 to access and/or interact with other devices in the hybrid power system 100. For example, the user device 105 may be a computer system such as, for example, a desktop computer, a mobile device, a tablet, etc. In some embodiments, the user device 105 may include a client hosted on one or more remote systems, e.g., in a cloud architecture, distributed computing cluster, or the like. In some embodiments, the user device 105 may include and/or access an embedded controller, an application specific circuit or processor, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the hybrid power system 100. For example, the electronic application(s) may include one or more of system control software, system monitoring software, scheduling tools, load analysis tools, forecasting tools, etc. The electronic application(s), such as the foregoing examples, may be configured to enable a user to select, modify, and/or control various options and/or behaviors of the hybrid power system 100. In some embodiments, the user device 105 may be configured to generate, implement, and/or display a Human-Machine-Interface (HMI) for the hybrid power system 100, and/or other information or interactive tools such as, for example, diagnostic processes, forecasting processes, scheduling processes, or the like.

The load 110 may include any number of systems, devices, or the like to be powered by the hybrid control system such as, for example, building electronic power systems, air conditioning systems, machines, (in the case of vehicles) propulsion devices, or the like. In some instances, a portion of the load 110 may be non-discretionary. In some instances, a portion of the load 110 may be automatic, e.g., a system or device that has a predetermined schedule of operation. In some instances, a portion of the load 110 may be at least partially predictable, e.g., systems or devices like air conditioning system that operate in correlation to ambient temperature or building electronic power systems that operate in correlation to business hours, or the like. In some instances, a portion of the load 110 may be user controlled, such as appliances, machines, or the like. In some instances, a portion of the load 110 may be controllable by the hybrid power system 100. For example, as discussed in further detail below, in some instances, the controller 135 may deactivate a portion of the load 110 when the power required by the load 110 exceeds power available from the hybrid power system 100.

The plurality of power asset groups 115 may include any suitable number of power asset groups. In the embodiment of the hybrid power system 100 depicted in FIG. 1, the plurality of power asset groups 115 includes a genset group 145, a PV group 150, an energy storage system group 155, and a power grid connection 160. It should be understood that in various embodiments, various power asset groups may be included or omitted in a hybrid power system instead of or in addition to the groups listed above. For example, a hybrid power system of a vehicle may not include a power grid connection. However, in some embodiments, a vehicle may include a power grid connection, e.g., in the form of a tether, trolley pantograph, electrified rail, etc. It should also be understood that the power asset groups listed above are exemplary only, and any suitable power asset group or groups may be included in any suitable arrangement. Illustrative examples of further power asset groups include a wind turbine group, a fuel cell group, a reactor group, etc. A hybrid power system according to one or more embodiments may include any suitable number of power asset groups, e.g., 2, 5, 10, 50, 250, etc., different groups. In some embodiments, different power asset groups may be of a same type, e.g., a plurality of different genset groups. In some embodiments, power asset groups may be hierarchical, e.g., a first power asset group may include as members a plurality of power asset sub-groups.

A power asset group may include any suitable number of power assets, e.g., 1 (such as, for example, some instances of a power grid connection or reactor), 5, 10, 100, etc. Power assets within a power asset group may be operatively connected within the hybrid power system 100 in any suitable manner. For example, in some instances, power assets within a power asset group may be connected in one or more banks, e.g., in parallel or in series. In some embodiments, individual power assets may be individually connected, or may be connected to the hybrid power system 100 via intermediary devices such as a transformer, a sub-station, an inverter, a rectifier, a load balancer, an electrical bus, a tie breaker, or the like.

In some embodiments, a power asset may include and/or be integrated with one or more sensor 120. For example, a power asset may include a sensor configured to detect one or more of or power output, voltage, frequency, ambient temperature, operating temperature, operational duration, etc.

The genset group 145 may include a plurality of gensets 146. The gensets 146 may have operational characteristics such as apparent power limits, active power rating limits, power factor range limits, a predetermined, regulated, and/or designed minimum load capacity, a start/stop frequency limit or threshold, a maximum load capacity, total operational lifetime, current operational age, fuel consumption rate, power output, maintenance cost, replacement cost, etc. Such characteristics may be predetermined, e.g., set during manufacture or established via regulatory requirement, or may vary over the course of operation or the lifetime of the genset(s). As discussed in further detail below, one or more aspects of such characteristics (e.g., one or more fuel consumption map(s)) may be sensed (e.g., via sensor(s) 120), simulated, mapped, tracked, and/or predicted (e.g., via the data resource device 125, the controller 135, or the like). As discussed in further detail below, such operations may occur in a background setting, e.g., at a slower rate than prospective operations discussed elsewhere in this disclosure.

The PV group 150 may include a plurality of PV devices 151, e.g., cells, banks or cells, or the like. The PV devices 151 may be characterized by maximum power output, a relation between irradiance of the PV device 151 and power output, a device lifetime, a device age, a replacement cost, etc. As discussed in further detail below, one or more aspects of such characteristics may be sensed (e.g., via sensor(s) 120), simulated, mapped, tracked, and/or predicted (e.g., via the data resource device 125, the controller 135, or the like). As discussed in further detail below, one or more aspects of such characteristics (e.g., cloud coverage, weather, temperature, or the like as well as associated characteristics such as irradiance and power capability forecasting) may be sensed (e.g., via sensor(s) 120), simulated, mapped, tracked, and/or predicted (e.g., via the data resource device 125, the controller 135, or the like).

The energy storage system group 155 may include a plurality of energy storage systems 156. In the embodiment depicted in the hybrid power system 100 in FIG. 1, the energy storage systems 156 are batteries or banks of batteries. However, in various embodiments, any suitable type of energy storage system 156 may be used such as, for example, a flywheel, a thermal energy storage system, pumped hydro-electric storage, pneumatic energy storage, etc.

The energy storage system 156 may be characterized by a state-of-charge (SOC), depth of discharge (DOD), a discharge energy cost, a charge energy cost, total lifetime, replacement cost, calendar aging, cycling aging, operating temperature, etc. As discussed in further detail below, one or more aspects of such characteristics (e.g., temperature, state of health, age, voltage, current, or the like) may be sensed (e.g., via sensor(s) 120), simulated, mapped, tracked, and/or predicted (e.g., via a management system of the energy storage system 156 (e.g., a battery management system), the data resource device 125, the controller 135, or the like).

The power grid connection 160 may be usable to supply power to the hybrid power system 100 from a power grid and/or export power out from the hybrid power system 100 into the power grid. The power grid connection 160 may be characterized by an energy cost for supplying power to the hybrid power system 100, an energy revenue for supplying power from the hybrid power system 100 to the power grid. In some instances, the energy cost and energy revenue for the power grid connection 160 may vary over time, e.g., due to demand, incentives, or other factors. As discussed in further detail below, one or more aspects of such characteristics (e.g., current and/or day-ahead prices by hour of day or the like, energy import/export limits or rules, energy concessions, trading, or commitments, etc.) may be retrieved, simulated, mapped, tracked, and/or predicted (e.g., via the data resource device 125, the controller 135, or the like).

The sensor(s) 120 may include any suitable number of sensors. The sensor 120 may be configured to sense one or more characteristics of one or more power assets in the plurality of power asset groups 115. For example, a temperature sensor may be used to sense a temperature of an energy storage system 156, a flow meter may be used to sense a fuel consumption rate of a genset 146, and/or an electrical sensor (e.g., a voltage, current, or power sensor, or the like), may be used to sense one or more aspects of power provided by a particular power asset, power drawn by the load 110, or the SOC or DOD of an energy storage system 156. A timer may be used to track how long a power asset, e.g., a genset 146, has been operating. A fuel meter may sense fuel consumption of a genset and/or genset group. A gas sensor may be used to sense emissions, e.g., from the genset group 145. In some embodiments, power assets of the power asset groups 115 may incorporate sensors and/or may be configured to output operational data indicative of characteristics of the power asset(s).

The data resource device 125 may include a server system, an electronic data system, computer-readable memory such as a hard drive, flash drive, disk, etc. In some embodiments, the data resource device 125 includes and/or interacts with an application programming interface for exchanging data to other systems, e.g., one or more of the other components of the hybrid power system 100. The data resource device 125 may include and/or act as a repository or source for data associated with the characteristics of the power assets in the plurality of power asset groups 115. In various embodiments, the data resource device 125 may include one or more of a device manager, device controller, a telematics system (e.g., for off-board data collection), an on-board and/or off-board data repository, or the like.

The data resource device 125 may be configured to obtain, generate, and/or store data such as, for example, one or more characteristics of the power assets in the plurality of power assets 115, characteristics of the load 110, weather and/or cloud data associated with forecasting a power availability for the PV group 150, costs of fuel for the genset group 145, import and export rates for the power grid connection 160. In some instances, the data resource device 125 may use historical data to generate forecast data. For example, the data resource device 125 may use historical information about the load 110 in order to generate a load forecast that predicts or estimates an amount of power needed by the load at, for example, different times of day, different days of the week, in different seasons, during different weather or ambient temperature conditions, etc. In another example, historical data may be used to estimate or predict a next day's prices of import and export of power via the power grid connection 160, or of costs for fuel for the genset group 145. In some embodiments, the data resource device 125 may use machine learning, e.g., deep learning, to generate forecasts.

The data resource device 125 may be configured to generate and/or obtain an optimal performance map for one or more power assets of the plurality of power asset groups 115. In various embodiments, an optimal performance map may be generated based on actual data associated with the power asset(s) and/or simulation data based on simulation of the power asset(s). In one example, optimal performance maps may be obtained that describe various scenarios of operating different and/or different numbers of gensets 146 in the genset group 145. An optimal performance map may map efficiency and/or cost vs. aggregate power, and/or may indicate optimal loading of various power assets for different aggregate power amounts. The optimal performance maps may indicate how much power may be available from each power asset, the energy cost for each power asset, or the like, e.g., individually and/or in combination with other power assets. In some embodiments, the data resource device 125 may be configured to generate, obtain, and/or update the optimal performance map(s) from time to time, e.g., periodically, and/or in response to a trigger condition such as an indication, e.g., from a sensor 120, that performance of a power asset has changed beyond a predetermined threshold.

In some embodiments, the optimal performance map(s) and/or characteristics of the power asset(s) indicated by the optimal performance map(s) may be used by the controller 135 when performing optimizations. While the computational cost of generating or updating an optimal performance map may be high, such generating or updating may occur infrequently relative to the optimization(s) performed by the controller 135. The optimal performance map(s) and/or characteristics of the power asset(s) indicated by the optimal performance map(s) may reduce a computational complexity of the optimization(s) performed by the controller 135.

In various embodiments, the electronic network 130 may be a wide area network ("WAN"), a local area network ("LAN"), personal area network ("PAN"), Ethernet, or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device (e.g., for telematics and/or data collection or transmission. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

The controller 135 may include one or more components to monitor, track, and/or control the operation the hybrid power system 100, e.g., the power assets of the plurality of power asset groups 115. For example, the controller 135 may include a memory 165 and a processor 170.

The memory 165 of the controller 135 may store data and/or software, e.g., instructions, models, algorithms, equations, data tables, or the like, that are usable and/or executable by the processor 170 to perform one or more operations for controlling the hybrid power system 100. For example, the controller 135 may be configured to receive input, e.g., from the plurality of power asset groups 115, the sensor(s) 120, the data resource device 125 and/or any other suitable source, and generate active power commands for each of the power assets in the power asset groups 115 based on the input. For example, the memory 165 may include one or more optimizer(s) 175 that, when executed by the processor 170, are configured to generate active power commands that optimize the operation of the hybrid power system 100. Although depicted as a single controller 135 in FIG. 1, it should be understood that, in various embodiments, the controller 135 may be distributed across multiple device and/or may include multiple control modules that operate in concert.

In some embodiments, the optimizer(s) 175 may be configured to perform constrained optimization. Constraints for one or more optimizations performed by the controller 135 may account for or be associated with various aspects of the hybrid power system 100 such as, for example, the load 110, capacities or ratings of the various power assets, characteristics or operational limitations of the various power assets, resiliency or redundancy parameters, or the like. In some instances, at least a portion of the constraints for the one or more optimizations may be soft constraints, e.g., constraints that weigh in to the optimization but that are not absolute requirements. In some instances, the constraints for the one or more optimizations may be segmented into groups of different priorities. In the case where not all of the constraints may be satisfied simultaneously, the controller 135 may be configured to meet higher priority constraints in favor of lower priority constraints. In some embodiments, the controller 135 may be configured to take an action, e.g., generate an active power command of a power asset that, while not satisfying a constraint instantaneously, may enable satisfaction of the constraint at a future time.

In an exemplary embodiment, constraints for the optimization may be segmented into 5 priority groups. It should be understood that the number of priority groups, as well as the grouping of constraints into such groups is illustrative only, and various embodiments may include any number of constraints sorted in any suitable manner into any suitable number of priority groups. A first, highest priority group of constraints may include the following. Net power provided by the hybrid power system 100 should match the power required by the load 110, whereby the net power may include both active and reactive power. The power provided by each power asset and/or power asset group 115 should not exceed a respective power rating. The PV devices 151 and the gensets 146 (and, for example, fuel cells or the like) should have non-negative loading, e.g., no reverse loading. The PV group 150 should be associated with at least one anchor source. Power supplied from or to the power grid connection 160 should not exceed import/export limits, respectively. The genset group 145 should operate with reactive power below a predetermined reactive power limit (e.g., that is based on a reactive capacity curve associated with a genset 146 and/or the genset group, and/or on associated power factor range limits or thresholds). The power assets should operate with an apparent power below a predetermined apparent power limit. The hybrid power system 100 should operate according to predetermined resiliency and/or redundancy requirements, e.g., an excess of power assets to replace power assets that may operate below nominal. SOC for the energy storage system(s) 156 and/or energy storage system group 155 should be maintained within a safe range, e.g., that is based on inputs to a management system (e.g., a battery management system).

A second priority group may include a constraint that positive spinning reserve (e.g., additional available energy generating capacity achievable by increasing the power output of genset(s) already engaged in operation) is available in an amount that at least meets a predetermined or predicted threshold need, e.g., due to sudden PV drop-off due to a cloud or sudden additional demand from the load 110. A third priority group may include a constraint that negative spinning reserve (e.g., additional decrease in the the power output of operating genset(s) without halting their operation) is available in an amount that at least meets a predetermined or predicted threshold need, e.g., due to sudden PV curtailing or sudden reduced demand from the load 110.

A fourth priority group may include the following. SOC for the energy storage system(s) 156 and/or energy storage system group 155 should be maintained within a predetermined target range, e.g., based on degradation and life considerations. The predetermined target range may be a narrower range than the safe range discussed above. The energy storage system(s) 156 and/or energy storage system group 155 should be charged as much as possible when SOC is below a threshold value. The energy storage system(s) 156 and/or energy storage system group 155 should be discharged as much as possible when SOC is above a threshold value.

A fifth priority group may include the following. A load on the genset(s) 146 and/or the genset group 145 should be above a minimum load threshold, e.g., to reduce wet-stacking and/or preserve an operating lifetime of the genset(s) 146 and/or the genset group 155. A load on the genset(s) 146 and/or the genset group 145 should be below a maximum threshold, e.g., to provide a safety margin to prevent overload and/or preserve an operating lifetime of the genset(s) 146 and/or the genset group 145.

It should be understood that the constraints and the grouping of the constraints above is illustrative only, and that any suitable constraints and/or grouping of such constraints may be used. Any suitable technique for implementing such constraints in the optimizer 175 may be used. For example, in some embodiments, each constraint may act as a metric. In some embodiments, the metric(s) may be binary, e.g., a value of zero for a satisfied constraint and a value of one for a violated constraint. In some embodiments, the metric(s) may have a range of values corresponding to how well or to what extent the constraint(s) are satisfied. The value of the metric(s) may be associated with, e.g., multiplied by, a weight value associated with the priority of the constraint(s), e.g., higher weight values for higher priority constraints, and included in a cost function of the optimizer 175 as an additional cost term, as discussed in more detail below.

In some embodiments, at least a portion of the constraints for the one or more optimizations may be hard constraints, e.g., that define operating limitations that may not be violated. In some embodiments, at least a portion of the constraints may be set, e.g., activated or deactivated by a user 140, e.g., via the user device 105. In various embodiments, constraints for the one or more optimizations may be based, for example, on customer and/or user specified options (e.g., via user device 105), and may include one or more of the following. The energy storage system group 155 is only to be charged via the PV group 150. Load on the genset group 145 is to be distributed proportionally across the gensets 146 in the genset group 145 based on power rating. Load on the energy storage system group 155 is to be distributed proportionally across the energy storage systems 156 in the energy storage system group 155 based on power rating. Load on the energy storage system group 155 is to be distributed proportionally across the energy storage systems 156 in the energy storage system group 155 based on a current energy capacity. SOC of the energy storage systems 156 in the energy storage system group 155 should be balanced, e.g., based on energy storage systems that are located proximate to each other, and/or on a total average SOC for the energy storage system group 155.

Although depicted as separate components in FIG. 1, it should be understood that a component or portion of a component in the hybrid power system 100 may, in some embodiments, be integrated with or incorporated into one or more other components. For example, a portion of the data resource device 125 may be integrated into the controller 135 or the like. In another example, the controller 135 may be integrated the user device 105. In some embodiments, operations or aspects of one or more of the components discussed above may be distributed amongst one or more other components. Any suitable arrangement and/or integration of the various systems and devices of the hybrid power system 100 may be used.

Figure 2:
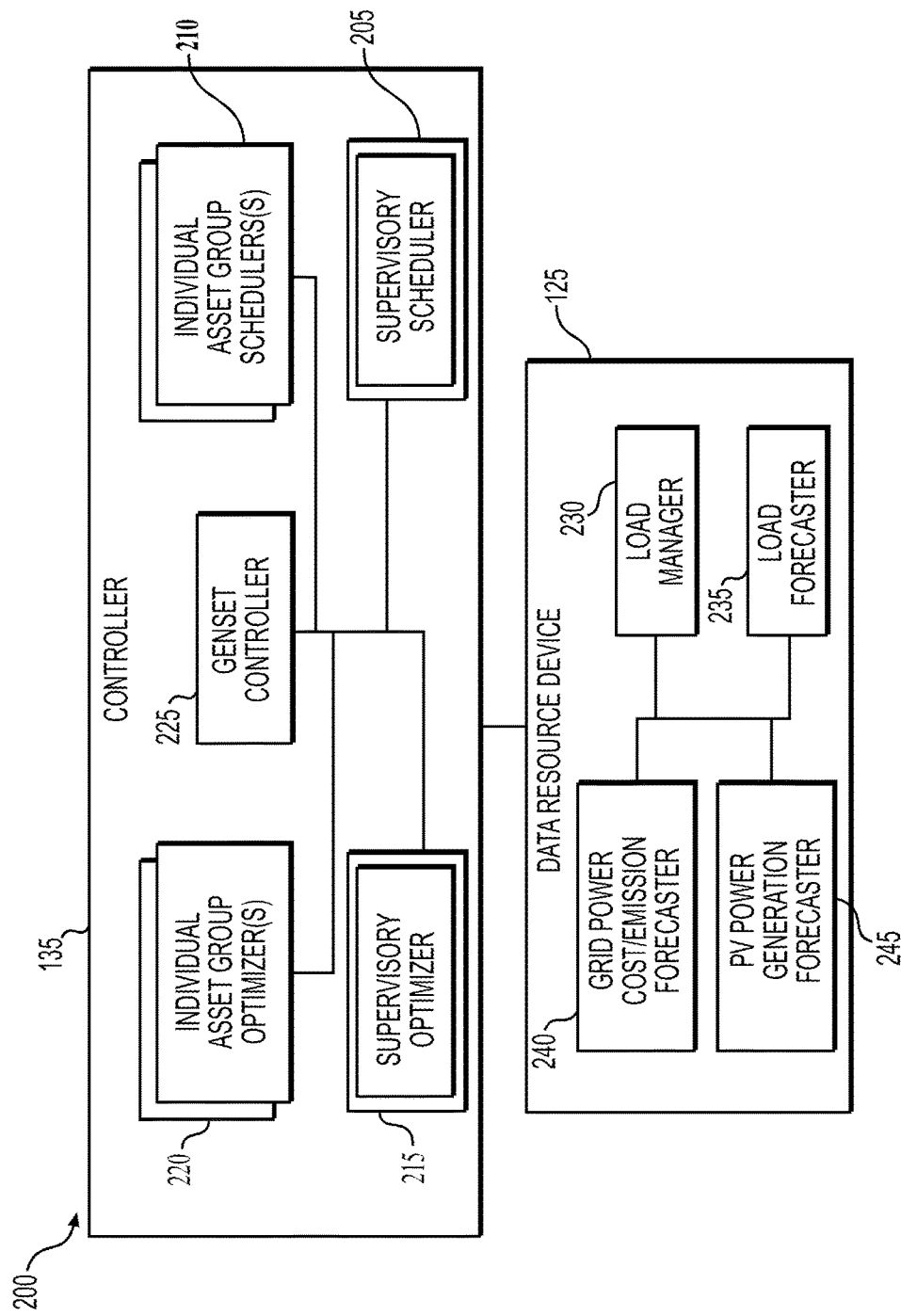
FIG. 2 depicts a schematic of an exemplary controller of the hybrid power system of FIG. 1, according to one or more embodiments.

FIG. 2 depicts a schematic 200 of an exemplary embodiment of the controller 135 of FIG. 1 in communication with the plurality of power asset groups 115 and the data resource device 125. As illustrated in FIG. 2, the optimizers 175 of the controller 135 may include a supervisory scheduler 205, a plurality of individual asset group schedulers 210, a supervisory optimizer 215, and a plurality of individual asset group optimizers 220. The controller 135 may further include a genset controller 225. The data resource device 125 may include a load manager 230, a load forecaster 235, a grid power cost/emissions forecaster 240, and a PV power generation forecaster 245. Each of the foregoing components is discussed in further detail below.

It should be understood that the distribution of such components across the controller 135 and the data resource device 125 is exemplar only. In various embodiments, components such as the foregoing may be distributed in any suitable manner across any number of devices including the controller 135 and the data resource device 125. For example, in an illustrative embodiment, the schedulers 205 and 210 may be grouped together with the forecasters 235 and 240 in a first device, e.g., a first prospective controller/device, and the optimizers 215 and 220 may be grouped with the load manager 230 and genset controller 225 in a second on-line controller/device.

Further, as noted above, in some embodiments, the controller 135 includes multiple and/or distributed controllers.

For example, in some embodiments, prospective components such as the supervisory scheduler 205 and the plurality of individual asset group schedulers 210 may be implemented on a first controller, and on-line components such as the supervisory optimizer 215 and the plurality of individual asset group optimizers 220 may be implemented on a second controller. Any suitable distribution of components across one or more controllers may be used. In an exemplary embodiment, the controller 135 and/or the data resource device 125 may be at least partially implemented virtually, e.g., may include virtualized components implemented on any suitable arrangement of hardware and/or software.

As noted above, the controller 135 may receive the optimal performance map(s) and/or characteristics of the power asset(s) indicated by the optimal performance map(s) from the data resource device 125. In some embodiments, the data resource device 125 may provide and/or update such information periodically, e.g., at a rate less frequent than at which the optimizer 175 of the controller 135 is operated. The controller 135 may use such information to generate and/or update one or more cost functions for the optimizer 175, as discussed in more detail below.

The load manager 230 may monitor, track, and/or store information associated with the load 110. For example, the load manager 230 may store on-line load data and/or historical data regarding different amounts for the load 110 at different times and/or under different circumstances. In some embodiments, the load manager 230 may include an on-line load management component configured to, for example, shed a portion of the load 110 and/or re-add a previously shed portion of the load 110. In some embodiments, the load manager 230 may include a load scheduler configured to assign a schedule to a portion of the load 110 that may be scheduled, e.g., automatically and or via user interaction by the user device 105.

The load forecaster 235 may obtain, for example, the historical data associated with the load 110. Based on the historical data, the load forecaster may generate a load forecast indicating predicted power requirements of the load 110 for a next future scheduling period such as the next day. Any suitable forecasting technique may be used such as, for example, averaging over a plurality of historical scheduling periods. In some embodiments, the load forecaster 235 may consider additional information, such as ambient weather or temperature conditions, or the like. In some embodiments, the load forecaster 235 may apply one or more machine learning techniques, e.g., deep learning, to generate the load forecast data.

The grid power cost/emissions forecaster 240 may obtain grid power cost/emissions data for the grid power connection 160. The grid power cost/emissions data may include, for example, cost or revenue, respectively for import or export of power via the power grid connection 160. In some embodiments, an entity associated with the power grid may provide such grid power cost/emissions data. In some embodiments, the grid power cost/emissions forecaster 240 may predict the grid power cost/emissions data, e.g., based on historical grid power cost/emissions data. In some embodiments, the grid power cost/emissions forecaster 240 may consider and/or apply incentives and/or negotiated rates when predicting the grid power cost/emissions data.

The PV power generation forecaster 245 may obtain historical weather and cloud data, e.g., for a geographical region associated with the PV group 150, and may obtain historical and/or current power generated by the PV group 150. The PV power generation forecaster 245 may further obtain one or more characteristics of the PV group 150, such as a standard power rating of the PV devices 151 in the PV group when under a standard amount of irradiation at standard temperature. The PV power generation forecaster 245 may further obtain data for temperature and irradiance during the next scheduling period. In some embodiments, such data may be based on historical data, e.g., via averaging historical periods of the same day, month, year, etc. via machine learning, or any other suitable technique. In some embodiments, such data may be obtained for current conditions, e.g., via sensor(s) 120 such as a temperature sensor and/or camera. In some embodiments, such data may be obtained or generated based on weather forecast data. Data for current conditions may be extrapolated to the next scheduling period. Based on the one or more characteristics of the PV group 150 and the temperature and irradiance data, the PV power generation forecaster 245 may determine a maximum power that may be available from the PV group 150. In some embodiments, the temperature and irradiance data may include data for multiple portions of the next scheduling period, e.g., each hour during a 24 hour day, and thus the maximum power for each portion may be determined.

The supervisory scheduler 205 may receive one or more of (i) the load forecast data from the load forecaster 235, (ii) the grid power cost/emissions data from the grid power cost/emissions forecaster 240, and (iii) the PV power availability forecast from the PV power generation forecaster 245. The supervisory scheduler 205 may be configured to perform at least one prospective group optimization, e.g., via the optimizer 175, to determine scheduled group active power commands for the plurality of power asset groups 115 that optimize a total operating cost of the hybrid power system over a predetermined future time period, e.g., over a period of a next twenty-four hours from the time of the optimization, or the like. In an exemplary embodiment, the at least one prospective group optimization is performed periodically, e.g., every few minutes, every hour, etc. The optimizer 175 may apply a prospective supervisory cost function described in further detail below.

The scheduled group active power commands for the plurality of power asset groups 115 may include power group-level output commands for each of the plurality of power asset groups 115. It should be understood that the scheduled group active power commands are prospective commands associated with the predetermined future time period, and are used, for example, as guidance for the determination of on-line active power commands to be implemented in an on-line, e.g., live or instantaneous fashion. In other words the scheduled group active power commands are based on the moving horizon established by the predetermined future time period, and thus account for future events within that time period, e.g., variance in the load 110, power asset group costs or availability or the like, while the on-line active power commands apply the scheduled active power commands but also account for the on-line status and condition of the power asset(s) and/or power asset group(s).

For the genset group 145, the scheduled group active power commands, e.g., form the supervisory scheduler 205, may include stop, continue, and/or start command schedules for individual gensets, and/or power command schedules for running the genset(s). Start commands may be based on start/stop timers, and/or a priority order for starting and/or stopping the genset(s). As discussed in more detail below, it may be beneficial to limit start and stop commands during periods when the operating state of the hybrid power system 100 is highly transient, e.g., the load 110 is fluctuating or changing. The start/stop timers may define a period for certain conditions (such as variance in the operating state being below a predetermined threshold for a predetermined period of time) must be exhibited by the hybrid power system 100 before the corresponding start or stop command is executed. In some embodiments, the start/stop timers may account for or be associated with one or more penalties associated with operation of the genset(s) for excessive start/stop frequency. In some embodiments, the priority order for genset starts/stops may be based on the cost function being optimized, e.g., that accounts for cost or emissions as discussed in further detail below, e.g., for similar gensets. In some embodiments, the priority order may be based on running hours, and/or one or more maintenance considerations. In some embodiments, that the supervisory scheduler 205 may include stop of an entire genset group or start of the first genset from a silent genset group using similar considerations as above. For the electronic storage system group 155, the scheduled group active power commands may include charge, idle and/or discharge command schedules, along with corresponding power command levels Each individual asset group scheduler 210 may be associated with a respective one of the power asset groups 115. The individual asset group scheduler 210 may receive the scheduled group active power commands corresponding to its respective power asset group. The individual asset group scheduler 210 may perform at least one prospective individual optimization, e.g., via the optimizer 175, to determine individual scheduled active power commands for each power asset within the respective power asset group. For example, the scheduled group active power commands for the genset group 145 may define one or more periods of time within a day during which power from the genset group 145 may be required, and how much power that may be during each period. The individual scheduled active power commands generated by the individual asset group scheduler 210 associated with the genset group 145 may define when each genset 146 in the genset group 145 should be started or stopped in order to meet the scheduled group active power commands for the genset group 145.

The individual active power commands associated with the energy storage system group 155 may include commands to charge, idle, or discharge each of the energy storage systems 156, as well as an amount of power to be charged or discharged.

The individual asset group scheduler 210 may perform the at least one prospective individual optimization periodically, e.g., after each instance of the at least one prospective group optimization.

The genset controller 225 may receive the individual active power commands associated with the genset group 145, and may be configured to track and/or manage the execution of the individual active power commands associated with the genset group 145 and/or the order in which gensets 145 are to be started or stopped.

The supervisory optimizer 210 may receive one or more of (i) the on-line load data from the load manager 230, (ii) the order in which gensets 146 are to be started or stopped from the genset controller 225, (iii) on-line operational status data for the plurality of power asset groups 115 from the plurality of individual asset group optimizers 220, on-line import/export cost data for the power grid connection 160, or on-line fuel cost data. On-line operational status data may include, for example, power being generated by each of the plurality of power asset groups 115, SOC and/or degradation of the energy storage system group 155, status, spin reserve, operating time, start/stop frequency of the genset group 145, etc. The supervisory optimizer 215 may receive or determine energy costs for each of the plurality of power asset groups 115, e.g., based on information received from the plurality of individual asset group optimizers 220 and/or the data resource device 125. The supervisory optimizer 215 may be configured to perform at least one on-line group optimization, e.g., via the optimizer 175, to determine group on-line active power commands for the plurality of power asset groups 115. The determined on-line active power commands may, for example, be optimized so as to (i) account for variance between the load forecast and the on-line load, (ii) account for variance between the power availability forecast and the on-line power availability, and (iii) optimize the total operating cost of the hybrid power system. In other words, as noted above, the on-line active power commands may consider and/or account for inputs from the prospective optimized schedulers, e.g., based on forecasted loads, power availability and pricing, and may superimpose an on-line optimization based on variance of actual loads, power capabilities and pricing, e.g., compared to assumptions made by the prospective optimizations. In an exemplary embodiment, the at least one on-line group optimization is performed continuously, in real or near real time, and/or on an instantaneous basis. The commands included in the group on-line active power commands may, for example, include the same or similar type of commands as the group prospective active power commands.

As noted above, the forecasts for the load 110, as well as the power availability and energy cost for each of the plurality of power asset groups 115 may be estimated, extrapolated, predicted, or the like. However, on-line conditions of the hybrid power system 100, as well as external conditions such as weather, temperature, costs for fuel or import/export of power via the power grid connection 160 may vary from the forecasts. Further, on-line capability of power assets may change, e.g., due to degradation or failure. The combination of the prospective optimization(s) and the on-line optimization(s) may enable the controller 135 to use the scheduled group active power commands as a baseline to determine the on-line active power commands. This combination may reduce the computational complexity of determining the on-line active power commands. Further, this combination may enable the controller 135 to combine the longer-term considerations of the prospective optimization with the shorter-term considerations of the on-line optimizations.

Each individual asset group optimizer 220 may be associated with a respective one of the power asset groups 115. The individual asset group optimizer 220 may receive the on-line group active power commands corresponding to its respective power asset group. The individual asset group scheduler 210 may perform at least one on-line individual optimization, e.g., via the optimizer 175, to determine individual on-line active power commands for each power asset within the respective power asset group. The commands included in the individual on-line active power commands may, for example, include the same or similar type of commands as the individual prospective active power commands. The individual asset group optimizer 220 may further be configured to operate the individual power assets of the corresponding power asset group.

The following are exemplary cost functions that may be used via the optimizer 175, such as in one or more of the optimizations discussed in the various examples and embodiments above. However, it should be understood that the following examples are illustrative only, and that any suitable cost functions may be used.

Equation 1, below illustrates an exemplary cost function for an on-line group optimization.

$$C(x, u, t) = C_{energy}(x, u, t) + C_{degr}(x, u, t) + C_{maint}(x, u, t) + C_{gsswr}(x, u, t), \quad (1)$$

In the equation above, "C" is the total determined cost to be optimized, "x" is a state variable describing operating status and/or characteristics of the hybrid power system 100, "u" is a variable holding the different possible on-line group active power commands, "t" is a variable for time within a scheduling period. "$C_{energy}$" is the sum of energy costs for the plurality of power asset groups 115, and is defined by equation 2:

$$C_{energy} = C_g + C_{es} + C_{pv} \quad (2)$$

whereby "$C_g$" is the determined energy cost for the genset group 145, "$C_{es}$" is the determined energy cost for the energy storage system group 155, and "$C_{pv}$" is the determined energy cost for the PV group 150. "$C_{pv}$" may be treated as negligible or null. "$C_g$" may be defined by the optimal performance maps(s) generated by the data resource device 125. "$C_{es}$" may be defined by differently based on whether the energy storage system group 155 is to be charged (equation 3) or discharged (equation 4).

$$C_{es}(t) = C_b(t) \eta_{ch}(P_{ch}(t)) \quad (3)$$

$$C_{es}(t) = C_b(t)/\eta_{dis}(P_{dis}(t)) \quad (4)$$

whereby "$C_b$" is the battery power cost (e.g., a weighted average of the cost of the power assets used to charge the energy storage system group 155 over its SoC), "$\eta_{ch}$" and "$\eta_{dis}$" are charging and discharging efficiency, respectively, and "$P_{ch}$" and "$P_{dis}$" are the amount of power charged or discharged, respectively. It should be noted that the terms in equation 2 may also be broken up into separate power terms and cost terms, and thus may alternatively be expressed as equation 2a:

$$C_{energy} = c_g(t)P_g(t) + c_{es}(t)P_{es}(t) + c_{pv}(t)P_{pv}(t) + c_u(t)P_u(t) + c_{fc}(t)P_{fc}(t) \quad (2a)$$

whereby the "fc" terms correspond to a power asset group for fuel cell(s) for embodiments including such a group.

Returning to equation 1, "$C_{degr}$" is the degradation cost of the energy storage system group 155, and may be defined by equation (5):

$$C_{degr}(t) = C_{bd}(P_{es}(t)) = [C_{bdcal}(t, P_{es}(t)) + C_{bdcyc}(t, P_{es}(t))] \quad (5)$$

whereby "$C_{bd}$" is the cost of battery aging, "$C_b$", "$P_{es}$" is the power output from the energy storage system group 155, "$C_{bd}$" is the calendar aging of the energy storage system group 155, and "$C_{bdcyc}$" is the cycling aging of the energy storage system group 155.

Calendar aging may be determined based on characteristics of the energy storage system group 155 including replacement cost at the end-of-life of an energy storage system 156, temperature effects on the energy storage system group 155, an amount of energy in the energy storage system group 155, and operating time of the energy storage system group 155.

Cycling aging may be determined based on a function of battery capacity of the energy storage system group 155, the replacement cost, and by tracking DOD since a most recent change in SOC direction during operation of the energy storage system group 155. In some embodiments, cyclic degradation over the course of the future time period for the prospective optimizations may be accounted for via any suitable technique such as, for example, a rainflow count, e.g., via the supervisory scheduler 205.

Returning again to equation 1, "$C_{maint}(t)$" is the maintenance cost for the genset group 145, and may be defined by equation (6):

$$C_{maint}(t)=C_{maint}R_g(t) \quad (6)$$

whereby "$C_{maint}$" is a linear curve fit for average maintenance cost for the genset group 145 over time as fed back from the individual asset group optimizer 215, e.g., based on running gensets 146 among the genset group 145, and "$R_g(t)$" is the running status of the genset group 145 (e.g., 1 for running, 0 for not running, i.e. silent group). It should be understood, however, that in various embodiments, the average maintenance cost for the genset group 145 over time may not be linear. Thus, in some embodiments, the $C_{maint}$ term may be a term that varies with time according to any type of function, e.g., $C_{maint}(t)$.

Returning yet again to equation 1, "$C_{gsswr}$" is start/stop frequency penalty for the genset group 145, and may be determined based on a maximum number of starts for scheduling period, the current number of starts within the current scheduling period, the total maintenance cost of the genset group 145 over it's operational lifetime, the total operational lifetime of the genset group 145, and the start/stop timer lengths.

In an example, an exemplary prospective group cost function may include an integral of an on-line individual optimization, such as the example above, along with a penalty related to a change in SOC over the scheduling period, e.g., the future period of time from the time at which the prospective optimization is performed. In some embodiments, the prospective group cost function may further include a term related to sustaining and/or improving the SOC of the energy storage system group 155 over the scheduling period. For example, in some use cases in which use is at least partially cyclical, e.g., in a vehicle, micro grid, or the like with daily cyclical loading and/or power generation (e.g., via the PV group 150), it may be beneficial for the SOC to be maintained or improved over the course of the scheduling period. In some embodiments, such as some of the use cases with cyclical loading and/or power generation, the cost for energy storage, e.g., "$C_{es}$", may be simplified to and/or negated in favor of degradation cost for the energy storage system group 155. For instance, in some such embodiments, the energy costs for charging the energy storage system group 155 may be accounted for by the costs associated with other sources acting as the source for the charge, such as the PV group 150.

In a further example, an exemplary on-line individual cost function associated with the genset group 145 may be determined by a summation across each genset 146 for individual energy cost, maintenance cost, and start/stop frequency penalty, such as in equation (7) below:

$$C_g(x, u, t)=\Sigma[C_{ge,i}(x, u, t)+C_{maint,i}(x, u, t)+C_{gsswr,i}(x, u, t)] \quad (7)$$

In an additional example, an exemplary prospective individual cost function may include an integral taken over the scheduling period of the on-line individual cost function. As noted above, the costs determined for the on-line optimizations, such as in the exemplary equations above pertains to a live, instantaneous, and/or on-line state of the power assets, load, and environment, e.g., based on sensor 120. For the prospective optimizations, such as the exemplary prospective group cost function and the prospective individual cost functions discussed above, the costs used for the optimization are integrals of cost forecasts, simulations, and/or predictions over the scheduling period, e.g., the predetermined future period of time from the time at which the prospective optimization is performed. In an illustrative example, the prospective individual cost function for the genset group may include an integration taken over the scheduling period of the individual energy costs for the scheduled operation of the gensets in the group, the maintenance costs due to the scheduled operation of the gensets in the group, and a start/stop frequency penalty assessed for each genset in the group based on the scheduled starts and stops for that genset.

In another example, an exemplary on-line individual cost function associated with the energy storage system group 155 may be determined by a summation across each energy storage system 156 for individual energy cost, degradation cost, and a balancing cost between SOCs of individual energy storage system 156 and the energy storage system 155 as a whole (e.g., based on the constraint discussed above for SoC balancing among various energy storage systems 156), such as in equation (8) below:

$$C_{es}(x, u, t)=\Sigma[C_{es,i}(x, u, t)+C_{degr,i}(x, u, t)]+w_{SOC}\Sigma[SOC_i(t)-SOC(t))]^2 \quad (8)$$

The prospective individual cost function for the energy storage system group 155 may, as above, include an integral of the on-line individual cost function taken over the scheduling period, and may additionally include a penalty related to a summation of the differences between the initial and final SOC of each energy storage system 156 over the course of the scheduling period.

Any suitable technique for performing optimizations according to the present disclosure may be used. For example, techniques that may be used include particle swarm optimization, model predictive control, Hamiltonian (PMP/ECMS), Gradient methods, PSO, Mixed Integer Programming Variants and/or a modified version of Equivalent Consumption Minimization Strategy.

In some embodiments, the on-line active power commands are automatically executed by the controller 135 on the power assets within the plurality of power asset groups 115. In some embodiments, at least a portion of the on-line active power commands may be provided, e.g., as recommendations, to the user device 105, whereby the user 140 may enter instructions via the user device 105 to confirm, reject, modify, or replace one or more of the on-line active power commands. In some embodiments, whether an on-line active power command is executed automatically or sent as a recommendation is determined based on whether and to what extent the constraints on the optimization are satisfied.

INDUSTRIAL APPLICABILITY

A hybrid power system, such as those described in one or more of the embodiments above, that is configured to one or more of combine prospective and on-line optimizations, or account for asset degradation, maintenance costs, and operating efficiency effects, may be used in conjunction with any appropriate load, and may act as a power system for a machine, vehicle, building, facility, power utility, or the like.

For example, a hybrid power system according to various aspects of this disclosure may act as a power system for a vehicle such as a construction vehicle, transport vehicle, or the like. Such a vehicle may include a plurality of power asset groups such as, for example, two or more of an internal combustion/genset group, an electronic storage system group, a fuel cell group, or the like. The load for the vehicle may include power to move the vehicle, e.g., to a transmission connected to wheels, treads, or the like, electronics for the vehicle, and/or a machine implement such as a shovel, lift, drill, mill, press, etc. In some instances, a vehicle may further include one or more power asset groups such as a power grid connection (e.g., via a trolley line or electrified rail connection), or a photovoltaic group (e.g., via photovoltaic cells disposed on an exterior of the vehicle). It should be understood that any suitable combination of power asset groups may be used, and that each power asset group may include any suitable number of power assets, including a single power asset or many.

In another example, a hybrid power system according to various aspects of this disclosure may act as a power system for a machine such as a manufacturing device, air-conditioning device, a computing device, etc. Such a machine may include a plurality of power asset groups such as, for example, two or more of a power grid connection, a genset group, an electronic storage system group, a fuel cell group, a photovoltaic group, or the like. The load for the machine may include a mechanical load (e.g., for machining or processing an article), electronics, or the like.

In a further example, a hybrid power system according to various aspects of this disclosure may act as a power plant for a facility, building, work-site, etc. Such a machine may include a plurality of power asset groups such as, for example, two or more of a power grid connection, a genset group, an electronic storage system group, a fuel cell group, a photovoltaic group, or the like. The load for the machine may include load for electronics, machines, or the like associated with the facility, building, work-site, etc. In some instances, the power plant may be fixed, e.g., a fixed installment for a building or multi-building facility. In some instances, the power play may be at least partially mobile, e.g., an at least partially temporary power plant for a construction job-site that enables the job-site to use a local power grid connection in combination with, for example, a genset group, an energy storage group, a photovoltaic group, and/or the like.

A controller 135 utilizing a combination of prospective and on-line optimizations and/or that accounts for asset degradation, maintenance costs, and operating efficiency effects may be applied, for example, to any power system that incorporates a plurality of power assets, e.g., power assets of different types.

In one aspect, it may be desirable to reduce computational complexity of optimization of cost for hybrid power systems. In another aspect, it may be beneficial to perform optimizations that account for both immediate factors and longer term factors impacting the operational life of power assets. In a further aspect, it may be beneficial to account for operating characteristics of power assets such as degradation, maintenance, and operating efficiency, which may impact both immediate and long term efficiencies and costs of a hybrid power system.

Figure 3:
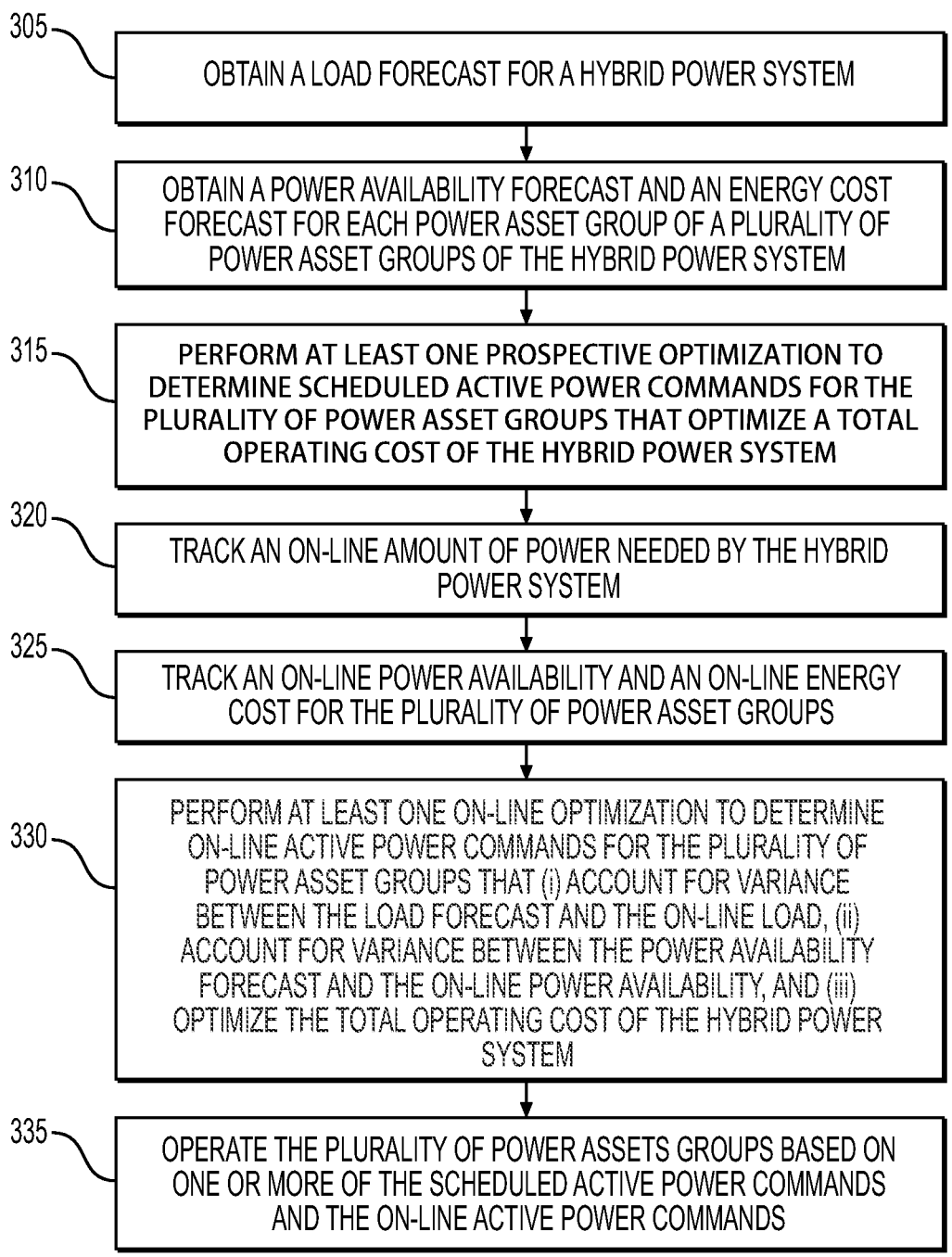
FIG. 3 depicts a flowchart of an exemplary method of operating a hybrid power system, according to one or more embodiments.

FIG. 3 is a flowchart illustrating an exemplary method 300 for operating a hybrid power system 100 according to one or more embodiments of this disclosure. While certain operations are described as being performed by certain components, it should be understood that such operations may be performed by different components and/or different combinations of components. Moreover, some operations may be executed at the instruction of and/or by the processor 170. Further, it should be understood that one or more of the operations below may be performed concurrently and/or in an order different than the order presented below. Additionally, in various embodiments, one or more of the following operations may be omitted, and/or additional operations may be added.

At block 305, a controller 135 of a hybrid power system 100 may obtain a load forecast of power needed by a load 110 of the hybrid power system 100, e.g., over the course of a scheduling period such as, for example, a day.

At block 310, the controller may obtain a power availability forecast and an energy cost forecast for each power asset group of a plurality of power asset groups 115.

In some embodiments, the load forecast, the power availability forecast, the energy cost forecast, and the prospective optimization are periodically updated. In some embodiments, at least a portion of one or more of the power availability forecast or the energy cost forecast is based on respective optimal performance maps for each individual power asset that, for example, may be generated by a data resource device 125 or the like. In some embodiments, the respective optimal performance maps are periodically updated at a first rate that is slower than a second rate for periodically updating the load forecast, the power availability forecast, the energy cost forecast, and a prospective optimization performed by the controller 135, as discussed in further detail below. In some embodiments, the plurality of power asset groups 115 includes two or more of a genset group 145, an energy storage system group 155, a photovoltaic group 150, and a power grid connection 160.

At block 315, the controller 135 may perform, e.g., via an optimizer 175, at least one prospective optimization to determine scheduled active power commands for the plurality of power asset groups 115 that optimize a total operating cost of the hybrid power system 100. In some embodiments, the at least one prospective optimization includes: a prospective group optimization that determines prospective group active power commands for each power asset group; and a prospective individual optimization that determines individual active power commands for each power asset within each group. In some embodiments, the at least one prospective optimization accounts for one or more of asset degradation, asset maintenance cost, or asset operating efficiency cost. In some embodiments, the at least one prospective optimization is a constrained optimization. In some embodiments, the at least one prospective optimization includes a plurality of soft constraints having different priority values.

At block 320, the controller 135 may track an on-line amount of power needed by the load 110 of the hybrid power system 100.

At block 325 the controller 135 may track an on-line power availability and an on-line energy cost for the plurality of power asset groups 115.

At block 330, the controller 135 may perform at least one on-line optimization to determine on-line active power commands for the plurality of power asset groups 115 that (i) account for variance between the load forecast and the on-line load, (ii) account for variance between the power availability forecast and the on-line power availability, and (iii) optimize the total operating cost of the hybrid power system 100. In some embodiments, the at least one on-line optimization includes: an on-line group optimization that determines on-line group active power commands for each power asset group; and an on-line individual optimization that determines individual active power commands for each power asset within each group. In some embodiments, the at least one on-line optimization accounts for one or more of asset degradation, asset maintenance cost, or asset operating efficiency cost. In some embodiments, the at least one on-line optimization is a constrained optimization. In some embodiments, the at least one on-line optimization includes a plurality of soft constraints having different priority values.

At block 335, the controller 135 may operate the plurality of power assets groups 115 based on one or more of the scheduled active power commands and the on-line active power commands.

Figure 4:
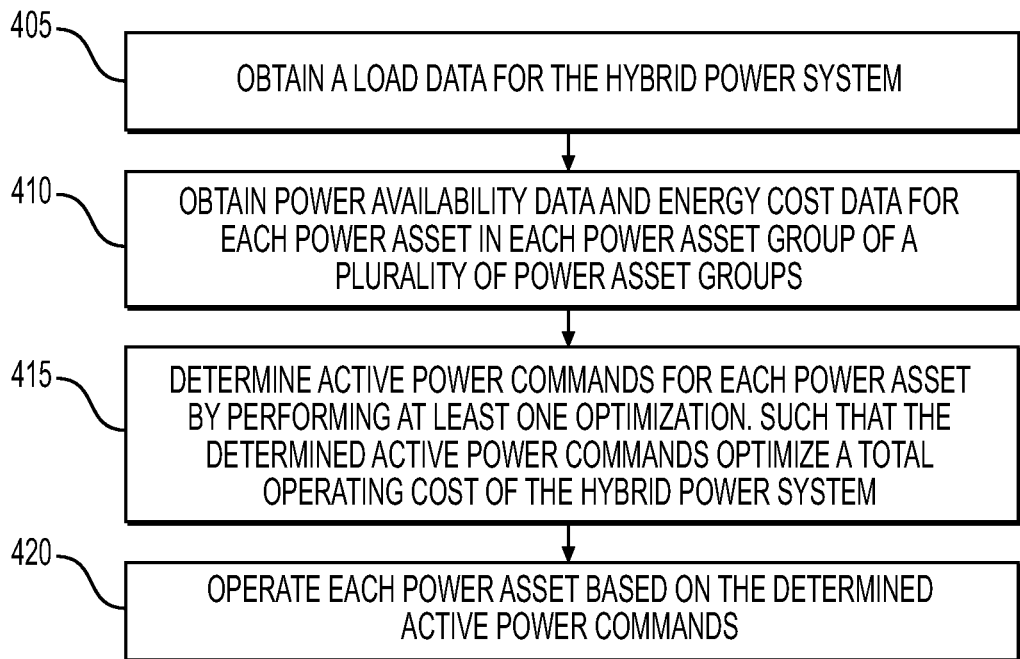
FIG. 4 depicts a flowchart of another exemplary method of operating a hybrid power system, according to one or more embodiments.

FIG. 4 is a flowchart illustrating another exemplary method 400 for operating a hybrid power system 100 according to one or more embodiments of this disclosure.

At block 405, a controller 135 of a hybrid power system 100 may obtain load data for the hybrid power system 100.

At block 410, the controller 135 may obtain power availability data and energy cost data for each power asset in each power asset group of a plurality of power asset groups 115. In some embodiments, the plurality of power asset groups 115 includes two or more of a genset group 145, an energy storage system group 155, a photovoltaic group 150, and a power grid connection 160.

At block 415, the controller 135 may determine active power commands for each power asset by performing at least one optimization, such that the determined active power commands optimize a total operating cost of the hybrid power system 100.

The at least one optimization may be based on at least one cost function that accounts for asset degradation, asset maintenance cost, asset operation efficiency cost, and the energy cost data. In some embodiments, the asset degradation includes calendar aging and cycling aging of the energy storage system group 155. In some embodiments, the asset maintenance cost for each genset 146 in the genset group 145 is based on an operation time of the genset 146. In some embodiments, the operation efficiency cost includes one or more of a state-of-charge balance factor between energy storage systems 156 in the energy storage system group 155, a cumulative state-of-charge change for each energy storage system 156 in the energy storage system group 155, or a start/stop frequency cost for each genset 146 in the genset group 145.

The at least one optimization may be constrained by a plurality of constraints based on the load data, the power availability data, and characteristics of the power assets.

In some embodiments, the at least one optimization may include at least one prospective optimization that is based on forecasts in the load data, the power availability data, and the energy cost data. In some embodiments, the at least one optimization may include at least one on-line optimization that is based on on-line data in the load data, the power availability data, and the energy cost data. In some embodiments, each of the at least one prospective optimization and the at least one on-line optimization respectively include a group optimization that determines active power commands for each asset power group on a group level. In some embodiments, each of the at least one prospective optimization and the at least one on-line optimization respectively include an individual asset optimization that determines active power commands for each power asset within each power asset group, based on the active power commands for the power asset group.

At block 420, the controller 135 may operate each power asset based on the determined active power commands. In some embodiments, the hybrid power system 100 is configured such that an imbalance between an on-line load of the hybrid power system and power generated by the plurality of power asset groups is fed into our out from the power grid connection, respectfully.

In some embodiments, operating a respective genset 146 in the genset group 145 based on the determined active power commands includes determining whether an operating condition of the hybrid power system 100 has been stable for a predetermined threshold period. Upon determining that the hybrid power system 100 has been stable for the predetermined threshold period, the controller 135 may wait for a predetermined period of time, and then starting or stop operation of the respective genset 146.

It should be understood that embodiments in this disclosure are exemplary only, and that other embodiments may include various combinations of features from other embodiments, as well as additional or fewer features.

One or more embodiments of this disclosure may reduce operating cost of a hybrid power system. One or more embodiments of this disclosure may reduce a computing complexity of optimizing the cost of a hybrid power system. One or more embodiments of this disclosure may improve the optimization of cost for a hybrid power system by accounting for operating characteristics such as asset degradation, maintenance costs, and operating efficiency effect. One or more embodiments of this disclosure may account for both immediate effects of operating decisions and longer term effects over the course of a scheduling period and/or an operational lifetime of power assets in a hybrid power system.

In general, any process or operation discussed in this disclosure that is understood to be computer-implementable, such as the processes illustrated in FIGS. 3 and 4, may be performed by one or more processors of a computer system, such any of the systems or devices in the hybrid power system 100 of FIG. 1, as described above. A process or process step performed by one or more processors may also be referred to as an operation or block. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
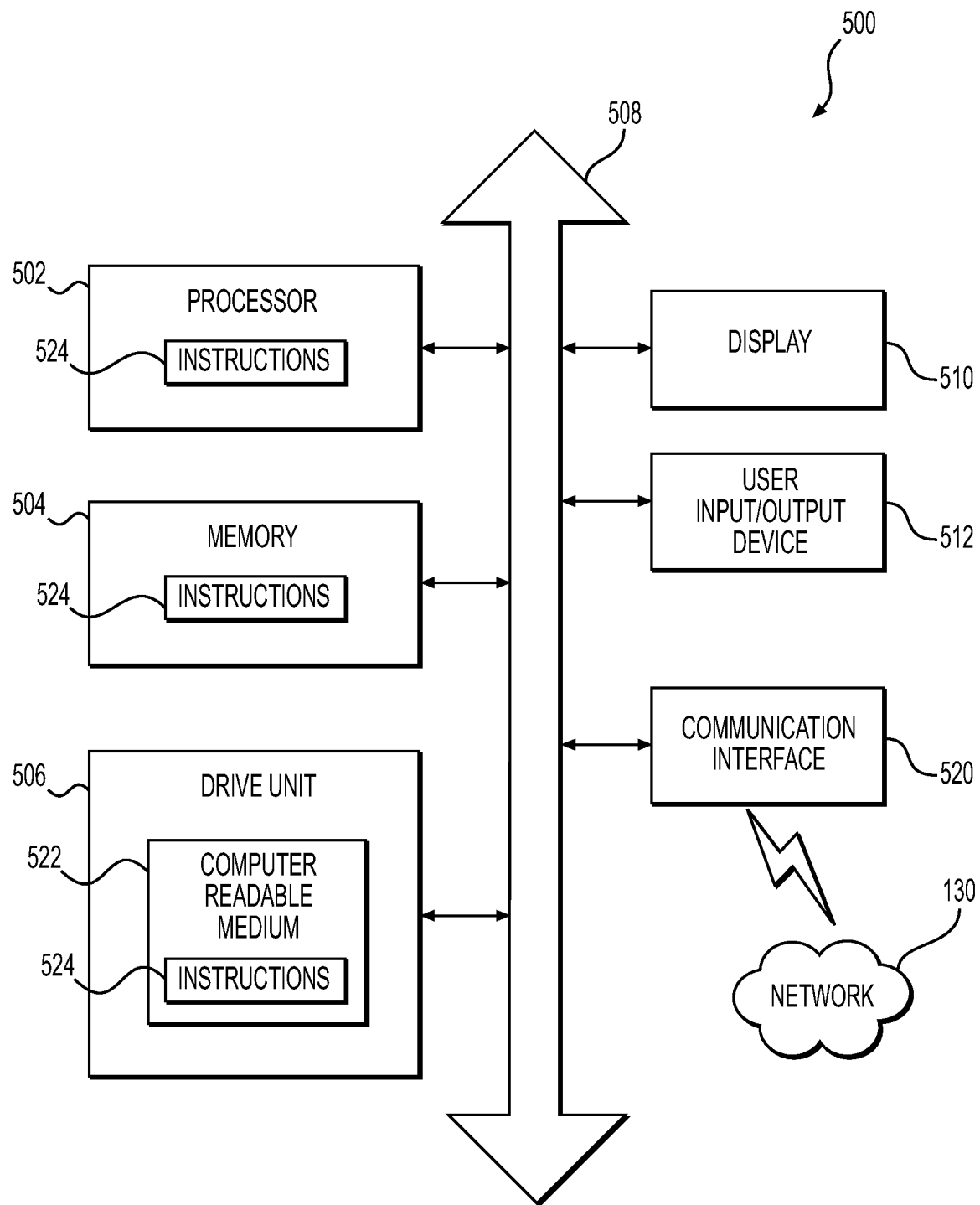
FIG. 5 depicts an example of a computing device, according to one or more embodiments.

FIG. 5 is a simplified functional block diagram of a computer 500 that may be configured as a device for executing the methods of FIGS. 2 and 3, according to exemplary embodiments of the present disclosure. For example, the computer 500 may be configured as the controller 135 and/or another system according to exemplary embodiments of this disclosure. In various embodiments, any of the systems herein may be a computer 500 including, for example, a data communication interface 520 for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method of operating a hybrid power system, comprising:
    obtaining load data for the hybrid power system;
    obtaining power availability data and energy cost data for each power asset in each power asset group of a plurality of power asset groups, the plurality of power asset groups including a genset group having a plurality of gensets; and
    determining active power commands for each power asset by performing at least one optimization, such that the determined active power commands optimize a total operating cost of the hybrid power system, wherein:
        the determined active power commands include one or more of a power on or start command, a power off or stop command, a continue command, an idle command, a charge command, or a discharge command;
        the at least one optimization is based on at least one cost function that accounts for asset degradation, asset maintenance cost, asset operation efficiency cost, and the energy cost data; and
        the at least one optimization is constrained by a plurality of constraints based on the load data, the power availability data, and characteristics of the power assets; and
    operating each power asset based on the determined active power commands, wherein operating a respective genset in the genset group based on the determined active power commands includes:
        determining whether an operating condition of the hybrid power system has been stable for a predetermined threshold period; and
        upon determining that the hybrid power system has been stable for the predetermined threshold period:
            waiting for a predetermined period of time; and
        after waiting for the predetermined period of time, starting or stopping operation of the respective genset.

2. The method of claim 1, wherein the plurality of power asset groups further includes one or more of, an energy storage system group, a photovoltaic group, or a power grid connection.

3. The method of claim 2, wherein asset degradation includes calendar aging and cycling aging of the energy storage system group.

4. The method of claim 2, wherein the asset maintenance cost for each genset in the genset group is based on an operation time of the genset.

5. The method of claim 2, wherein the operation efficiency cost includes one or more of a state-of-charge balance factor between energy storage systems in the energy storage system group, or a cumulative state-of-charge change for each energy storage system in the energy storage system group.

6. The method of claim 1, wherein the at least one optimization includes:
at least one prospective optimization that is based on forecasts in the load data, the power availability data, and the energy cost data; and
at least one on-line optimization that is based on on-line data in the load data, the power availability data, and the energy cost data.

7. The method of claim 6, wherein each of the at least one prospective optimization and the at least one on-line optimization respectively include
a group optimization that determines active power commands for each asset power group on a group level; and
an individual asset optimization that determines active power commands for each power asset within each power asset group, based on the active power commands for the power asset group.

8. The method of claim 1, wherein:
the hybrid power system includes a power grid connection; and
the hybrid power system is configured such that an imbalance between an on-line load of the hybrid power system and power generated by the plurality of power asset groups is fed into or out from the power grid connection, respectfully.

9. The method of claim 8, wherein the at least one cost function is further configured to account for import costs and export costs for feeding power into and out from the power grid connection, respectfully.

10. The method of claim 1, wherein:
the hybrid power system is a power system of a vehicle; and
the plurality of power asset groups further includes an energy storage system group and one or more of an internal combustion group or a power grid connection group.

11. The method of claim 1, wherein:
the hybrid power system is a power system of a building or facility; and
the plurality of power asset groups further includes a power grid connection and an energy storage system group.

12. A controller for a hybrid power system, comprising:
at least one memory storing instructions; and
at least one processor operatively connected to the memory, and configured to execute the instructions to perform operations, including:
obtaining load data for the hybrid power system;
obtaining power availability data and energy cost data for each power asset in each power asset group of a plurality of power asset groups, the plurality of power asset groups including a genset group having a plurality of gensets; and
determining active power commands for each power asset by performing at least one optimization, such that the determined active power commands optimize a total operating cost of the hybrid power system, wherein:
the determined active power commands include one or more of a power on or start command, a power off or stop command, a continue command, an idle command, a charge command, or a discharge command;
the at least one optimization is based on at least one cost function that accounts for asset degradation, asset maintenance cost, asset operation efficiency cost, and the energy cost data; and
the at least one optimization is constrained by a plurality of constraints based on the load data, the power availability data, and characteristics of the power assets; and
operating each power asset based on the determined active power commands, wherein operating a respective genset in the genset group based on the determined active power commands includes:
determining whether an operating condition of the hybrid power system has been stable for a predetermined threshold period; and
upon determining that the hybrid power system has been stable for the predetermined threshold period:
waiting for a predetermined period of time; and
after waiting for the predetermined period of time, starting or stopping operation of the respective genset.

13. The controller of claim 12, wherein the plurality of power asset groups further includes one or more of a photovoltaic group or a power grid connection.

14. The controller of claim 12, wherein:
the at least one optimization includes:
at least one prospective optimization that is based on forecasts in the load data, the power availability data, and the energy cost data; and
at least one on-line optimization that is based on on-line data in the load data, the power availability data, and the energy cost data; and
each of the at least one prospective optimization and the at least one on-line optimization respectively include
a group optimization that determines active power commands for each asset power group on a group level; and
an individual asset optimization that determines active power commands for each power asset within each power asset group, based on the active power commands for the power asset group.

15. The controller of claim 12, wherein:
the hybrid power system includes a power grid connection;
the hybrid power system is configured such that an imbalance between an on-line load of the hybrid power system and power generated by the plurality of power asset groups is fed into or out from the power grid connection, respectfully; and
the at least one cost function is further configured to account for import costs and export costs for feeding power into and out form the power grid connection, respectfully.

16. The controller of claim 12, wherein either:
(i) the hybrid power system is a power system of a vehicle, and the plurality of power asset groups further includes an energy storage system group and one or more of an internal combustion group or a power grid connection group; or (ii) the hybrid power system is a power system of a building or facility, and the plurality of power asset groups further includes a power grid connection, and an energy storage system group.

17. A hybrid power system, comprising:

a plurality of power asset groups that includes a genset group and one or more of an energy storage system group, a photovoltaic group, or a power grid connection; and a controller that includes:
- at least one memory storing instructions; and
- at least one processor operatively connected to the memory, and configured to execute the instructions to perform operations, including:
  - obtaining load data for the hybrid power system;
  - obtaining power availability data and energy cost data for each power asset in each power asset group of the plurality of power asset groups; and
  - determining active power commands for each power asset by performing at least one optimization, such that the determined active power commands optimize a total operating cost of the hybrid power system, wherein:
    - the determined active power commands include one or more of a power on or start command, a power off or stop command, a continue command, an idle command, a charge command, or a discharge command;
    - the at least one optimization is based on at least one cost function that accounts for asset degradation, asset maintenance cost, asset operation efficiency cost, and the energy cost data; and
    - the at least one optimization is constrained by a plurality of constraints based on the load data, the power availability data, and characteristics of the power assets; and
  - operating each power asset based on the determined active power commands, wherein operating a respective genset in the genset group based on the determined active power commands includes:
    - determining whether an operating condition of the hybrid power system has been stable for a predetermined threshold period; and
    - upon determining that the hybrid power system has been stable for the predetermined threshold period:
      - waiting for a predetermined period of time; and
      - after waiting for the predetermined period of time, starting or stopping operation of the respective genset.

18. The hybrid power system of claim 17, wherein:

the hybrid power system is a power system of a vehicle; and the plurality of power asset groups further includes an energy storage system group and one or more of an internal combustion or a power grid connection group.

19. The hybrid power system of claim 17, wherein:

the hybrid power system is a power system of a building or facility; and the plurality of power asset groups further includes a power grid connection and an energy storage system group.

* * * * *